United States Patent [19]

Masuyama

[11] 4,393,086
[45] Jul. 12, 1983

[54] DIETARY PRODUCT CONTAINING GLUCOMANNAN POWDER AND METHOD FOR PREPARING

[76] Inventor: Yoshinari Masuyama, No. 5-19-19, Higashi Gotanda, Shinagawa-Ku, Tokyo, Japan, 141

[21] Appl. No.: 243,382

[22] Filed: Mar. 13, 1981

Related U.S. Application Data

[63] Continuation-in-part of Ser. No. 96,160, Nov. 20, 1979, abandoned.

[30] Foreign Application Priority Data

Oct. 19, 1979 [JP] Japan ................. 54-134156

[51] Int. Cl.³ .............................. A23L 1/30
[52] U.S. Cl. ................... 426/74; 426/285; 426/648; 426/453; 426/804; 424/94; 264/109
[58] Field of Search ............. 426/74, 285, 648, 453, 426/804; 424/94; 264/109

[56] References Cited

U.S. PATENT DOCUMENTS 2,182,171 12/1939 Coyner ................. 426/648
3,035,920 5/1962 Knodt ................. 426/453
3,424,842 1/1969 Nürnberg ............. 264/109
3,873,750 3/1975 Torr ................... 426/648

OTHER PUBLICATIONS

Little, et al., Tablet Making, The Northern Pub. Co. Ltd., England, 1963 pp. 119–121.

Primary Examiner—Jeanette M. Hunter
Attorney, Agent, or Firm—Armstrong, Nikaido, Marmelstein & Kubovcik

[57] ABSTRACT

A dietary product in the form of a tablet and containing glucomannan powder, beef bone dust which contains marrow, and lactose powder and a method for preparing the tablet is disclosed. The composition comprises about 20–50 parts by weight of the glucomannan powder, 5–10 parts by weight of the beef bone dust, and 20–50 parts by weight of the lactose powder. Ingredients to impart flavor, color, odor or other desired properties to the composition are optionally included. The tablets are prepared by stamping a uniform mixture of the powders at a pressure of about 70–80 kg/cm².

3 Claims, No Drawings

DIETARY PRODUCT CONTAINING GLUCOMANNAN POWDER AND METHOD FOR PREPARING

This application is a continuation-in-part of application Ser. No. 96,160, filed Nov. 20, 1979 now abandoned.

BACKGROUND OF THE INVENTION

The present invention relates to a dietary composition in the form of tablets and to a method for manufacturing the tablets. The tablets contain as a primary ingredient glucomannan powder having a particle size of 100–200 mesh (Tyler series).

It is common knowledge that the number of obese people is increasing probably because of improvements in economic and food situations from 1960 onward and changes in modes of living. It is considered that corpulence is undesirable for maintaining health and a graceful figure, particularly for women.

In recent years, glucomannan powder has been popularly used (in many cases, glucomannan powder is available on the market in an aluminum pack containing a dose thereof, which is to be stirred in water before use) as a means of reducing body weight. The glucomannan powder is essentially tasteless and odorless, but it cannot be taken easily by some people.

An object of the present invention is to provide a dietary composition containing glucomannan which can be readily used by most people.

A further object of the present invention is to provide a process for forming glucomannan powder into tablets which can be easily administered, stored, and transported.

Another object of the present invention is to provide a process for forming glucomannan powder into tablets which are rapidly dissolved in the stomach.

SUMMARY OF THE INVENTION

These and other objects are achieved according to the present invention by providing a dietary composition containing, by weight, (a) 20 to 50 parts of glucomannan powder having a particle size of 100 to 200 mesh; (b) 5 to 10 parts of beef bone dust containing marrow and having a particle size of 100 to 200 mesh; and (c) 20 to 50 parts of lactose powder having a particle size of 80 to 150 mesh. The composition is readily formed into tablets by stamping a mixture of the powders under a pressure of from 70 to 80 kg/cm$^2$.

In a preferred embodiment the composition comprises, by weight, 30 to 40 parts of the glucomannan powder, 7 to 8 parts of the beef bone dust and 30 to 40 parts of the lactose powder.

DESCRIPTION OF PREFERRED EMBODIMENTS

The glucomannan employed in the present invention is particularly that contained in a large amount in a tuberous root of devil's tongue (Amorphophallus konjac C. Kock). Glucomannan powder is obtained by, for example, extracting devil's-tongue powder with water under 1.5 atmos. or with a 10% liver oil solution, then adding Fehling's solution thereto to effect precipitation, then treating the precipitates with hydrochloric acid, filtering the precipitates and purifying the same by washing with ethanol.

The glucomannan is employed in the form of a finely divided powder having a particle size of 100–200 mesh. The powder is obtained, for example, by pulverizing a commercially available glucomannan powder of a particle size of 50–80 mesh.

If coarser glucomannan powder, such as, 50–80 mesh, is used to make tablets according to the method of the present invention, there is a tendency for the tablets to get out of shape or fall to pieces. If the powder is finer, the resulting tablets are more structurally strong or solid, while still readily disintegratable in solution.

The beef bone dust employed in the invention may be prepared by finely dividing beef bone and calcining the finely divided bone at a relatively low temperature of about 140° C. Because the heating is low, the resulting bone dust still contains marrow tissue. The beef bone dust contains approximately 80% by weight or more of a mixture of calcium phosphate, elemental calcium, other phosphates and carbonates. It also contains about 5 to 20% by weight of marrow which in turn, contains about 10 to 20% by weight of mucopolysaccharides including chrondroitine, collagen, hyaluronic acid, etc. It is believed that in the method of the present invention the marrow facilitates the direct compression of the mixed powders into tablets. Tablets containing beef bone dust according to the present invention are substantially improved in solidity and compactness as compared with those containing no bone dust. Furthermore, the beef bone dust serves to facilitate the gelation of glucomannan in solution or in the stomach. Specifically, the calcium contents in the bone dust coact with glucomannan for the gelation. In the present invention the particle size of the beef bone dust is preferably about 100–200 mesh.

The lactose powder employed in the present invention is commercially available. For the present invention it is preferable that the lactose have a particle size of 80 to 150 mesh. Lactose powder with a smaller size, such as, about 200 mesh may be used in the present invention although the resulting mixture with bone dust and glucomannan does not flow well when it is introduced into a tableting machine. The particle size of the lactose is most preferably 100 mesh.

In the present invention additional ingredients such as for flavor, odor, color or the like or for providing other desirable properties can optionally be added to the composition. These ingredients can be employed in an amount of up to about 25% by weight based on the total weight of the composition. For example, small amounts of additives such as sorbitol, malic acid and flavors may be incorporated into the composition.

In the method according to the present invention the glucomannan powder, beef bone dust (containing marrow) and lactose powder are combined and mixed until a homogenous mixture is obtained. The mixing can be carried out by any conventional means. Thus, for example, the mixing can be carried out in a twin-cylinder mixer for 10 to 20 minutes.

Preferably, the lactose powder and beef bone dust are mixed together before the glucomannan powder is added thereto. However, the order of addition is not critical. After the desired amounts of the finely divided powders are mixed together, and without any further preparation the mixture can be molded or compressed into tablets. For example, the mixture can be stamped under pressure of about 70–80 kg/cm$^2$ to form tablets having a diameter of about 12 mm, a thickness of about 4–5 mm and a weight of about one gram. The forming of powders or a mixture of fine powders such as described above into tablets by molding under pressure is well-known in the art and does not require further description herein.

As an example of the dietary composition according to the present invention, 35% by weight of glucomannan powder of 100-200 mesh, 7% of marrow-containing beef bone dust, 34% of lactose powder and 24% of other additives such as flavor, sour, etc. are mixed together to form a homogeneous mixture and the powder mixture is then directly stamped into tablets by compression with a tableting machine (for example, HT-PP2 from Hata Tekko-Jo Co.) under a pressure of 70-80 kg/cm$^2$.

It will be understood that the present invention has been described and illustrated by the above examples. It is comtemplated that the above mixing ratio can be suitably altered as well as the order of adding the ingredients, and as stated various amounts of other ingredients desired for special purposes may be incorporated for further improving the product and method. According to the present invention, the above described objects can be obtained by the composition and the method of making same as explained above.

What is claimed is:

1. A dietary powder composition in the form of a tablet which comprises 20 to 50 parts by weight of glucomannan powder having an average particle size of 100 to 200 mesh, 5 to 10 parts by weight of beef bone dust containing marrow and having an average particle size of 100 and 200 mesh, and 20 to 50 parts by weight of lactose powder having an average particle size of 80 to 150 mesh.

2. A composition as claimed in claim 1, comprising 30 to 40 parts by weight of the glucomannan powder, 7 to 8 parts by weight of the beef bone dust and 30 to 40 parts by weight of the lactose powder.

3. A composition as claimed in claim 1 containing up to about 25% by weight based on the total weight of the composition of flavor, odor and/or color additives.

* * * * *